United States Patent [19]

Balabaud et al.

[11] Patent Number: 5,429,837
[45] Date of Patent: Jul. 4, 1995

[54] MANUFACTURE OF ANTI-REGURGITANT MILK FOR INFANTS

[75] Inventors: Christine Balabaud, Chevilly la Rue; Alain Loones, Villiers sur Marne, both of France

[73] Assignee: Compagnie Europeenne de Diffusion de Produits Laitiers Cedilac SA, France

[21] Appl. No.: 166,447

[22] Filed: Dec. 13, 1993

[30] Foreign Application Priority Data

Dec. 17, 1992 [FR] France ................ 92 15570

[51] Int. Cl.⁶ .............. A23L 1/0526; A23L 3/00; A23C 9/20
[52] U.S. Cl. .................. 426/521; 426/522; 426/573; 426/575; 426/577; 426/580
[58] Field of Search ............... 426/580, 573, 575, 577, 426/521, 522, 801

[56] References Cited

U.S. PATENT DOCUMENTS 2,871,123  1/1959  Bauer et al.
3,174,866  3/1965  Saperstein.
3,803,311  4/1974  Ho ........................ 426/801
4,303,692  12/1981  Gaull.

FOREIGN PATENT DOCUMENTS 2516355  11/1982  European Pat. Off.
0419885   8/1990  European Pat. Off.
2416651   2/1979  France.
2110517  11/1982  United Kingdom.

OTHER PUBLICATIONS

French Patent Document FR-M-3,789 (S.I.F.A.) *exemple*.

Primary Examiner—Helen Pratt
Attorney, Agent, or Firm—Harris Beach & Wilcox

[57] ABSTRACT

A process for the manufacture of anti-regurgitation infant milk is disclosed wherein the milk is preheated, homogenized, and treated at ultra high temperatures and wherein a thickening agent, such as carob, guar, carrageenans, or pectins, is added prior to the homogenization step in an amount of between 0.3% and 1.0% by weight of the milk. The milk is then packaged under aseptic conditions in sterile packages.

8 Claims, No Drawings

MANUFACTURE OF ANTI-REGURGITANT MILK FOR INFANTS

BACKGROUND OF THE INVENTION

The invention relates to a process for the manufacture of a longlife and anti-regurgitation, in particular liquid infant milk; it also relates to the milk thus obtained.

For the feeding of infants, so-called infant milk is used which, most frequently, is provided in the form of powder which is dissolved in previously heated water.

As is known, infants are frequently subject to simple, lightly abundant regurgitations which often occur after meals or during eructation phenomena. These regurgitations have no effect on the development of the child and are mainly a matter of discomfort. More rarely, real gastroesophageal refluxes exist which are linked to anatomical errors and which can have esophageal and respiratory consequences. Faced with this problem, mothers consult the child's doctor (often a pediatrician) who is generally led to prescribe proprietary products, sold in pharmacies, which contain thickening agents such as pectin, carob, carboxymethylcellulose and the like. The proprietary product in powdered form is added to the infant milk, previously heated in a water bath or in a microwave oven. Everything must be added together then allowed to stand for several minutes until thickening occurs. Although very widely used for several decades, this technique is not satisfactory because, on the one hand, the dosing of the addition is always delicate and often imprecise, and on the other hand, it is long and requires a means of heating, and finally curds often form which block the nipples. Moreover, the texture of the reconstituted product changes over time and necessitates immediate consumption of the preparation.

These thickening agents act upon contact with the acidity of the stomach by thickening the alimentary bolus, thus making it possible to avoid the refluxes by gravitational effect. The use of thickening preparations is recommended as a first choice for simple regurgitations. Drug therapies are instead reserved for recalcitrant regurgitations and especially for true refluxes.

Moreover, the manufacture of longlife milk by a process called "UHT" (Ultra High Temperature) is well known. This process being well known, it is unnecessary to describe it here in detail. Essentially, this widely industrialized process consists:

in preheating a milk, standardized or otherwise, for example at 70°-75° C.;
in homogenizing this preheated milk by throttling at high pressure (greater than $1.7 \times 10^7$ Pascals) in order to break up the fat globules and thus prevent the cream from rising;
then, in sterilizing by thermal shock at 130°-145° C. for two to ten seconds;
finally, after cooling, in packaging under an aseptic atmosphere and in sterile packages.

However, as is known, this UHT milk is not adapted to the specific needs of infants, even after addition of thickening agents.

The invention overcomes these disadvantages. It relates to a process for the manufacture of longlife, ready-to-use infant milk which attenuates or even eliminates the risks of regurgitation.

SUMMARY OF THE INVENTION

This process for the manufacture of a longlife, ready-to-use and anti-regurgitation infant milk, which consists:

in preheating, then homogenizing an infant milk,
then, in treating this milk at ultra high temperature (UHT),
finally, in packaging under aseptic atmosphere in sterile packages, is characterized in that just before the homogenization stage, there is introduced into the milk from 0.3 to 1%, calculated by weight of the packaged sterile milk, a thickening agent chosen from the group comprising carob, guar, carrageenans and pectins, alone or mixed with each other.

DETAILED DESCRIPTION OF THE INVENTION

In other words, the invention consists, at a specific stage of the UHT process, namely just before the homogenization stage and preferably before the preheating phase which precedes the homogenization, in introducing into the milk a specific thickening agent, and in precise quantities, namely of between 0.3 and 1%. It could not have been imagined that this simple selection would make it possible to successfully solve a problem which has existed for a long time, namely the manufacture of a longlife, ready-to-use and anti-regurgitation infant milk.

Advantageously, the thickening agent is carob, which gives the best results.

As is known, the carob widely used in the food industry is the endosperm of the bean from the carob tree. This product, which is well known for its thickening properties, is widely described in the literature. As already stated, it is important that the quantity introduced, calculated relative to the weight of packaged sterile milk, is between 0.3 and 1%. It has been observed that if this proportion is less than 0.3%, an insufficient thickening effect is obtained. Likewise, if this proportion exceeds 1%, a gelled product is obtained which is unsuitable for consumption by infants. Good results are obtained with a quantity of between 0.5 and 0.8%.

In practice, this thickening agent can be introduced in two forms:

on the one hand, in pulverulent form directly into the infant milk;
on the other hand, previously dissolved in distilled water, or more generally in deionised water, at room temperature, with very rapid stirring (1000 revolutions/minute and more) and is kept stirring (100 revolutions/minute and more) before being sent into the circuit; it is essential that this thickening product is maintained stirred.

As already stated, carob gives the best results. It can be replaced by guar.

Advantageously, in practice:

the carob is introduced at room temperature and with vigorous stirring (more than 1000 revolutions/minute) in pulverulent form in an amount of 0.5 to 0.8% carob flour, or in the form of an aqueous solution containing 10 to 35 grams/liter of carob;
the aqueous carob solution is continuously stirred before being sent upstream to the preheating and homogenization;
the thickening agent may consist of a mixture, in appropriate quantity, of guar and pectins;

a solution of vitamins commonly used in the dairy industry is also added to the solution of milk to be homogenized.

It could not have been imagined that by virtue of the use of this well known thickening agent, used under well defined conditions and in precise quantities, namely just before the preheating stage which precedes the homogenizer, it would thus be possible to prepare a longlife ready-to-use and anti-regurgitation infant milk, whose production was not known up until now.

While most frequently, the typical infant milk is liquid, it can also be converted into a powder by conventional techniques especially such as spray drying.

The manner in which the invention can be performed and the advantages resulting therefrom will emerge more clearly from the exemplary embodiments below.

EXAMPLE 1

Eighty (80) kilograms (kg) of a liquid infant milk are introduced, at room temperature into a stainless steel tank.

Separately, a solution containing 3% carob in deionised water is prepared in a tank at room temperature.

The carob is introduced with vigorous stirring (turbine, centrifugal pump) in deionised water (1000 revolutions/minute and more).

A solution which is translucent in colour having a viscosity of 48 Pascals.second is obtained, which is kept at room temperature with stirring, because of its high viscosity.

This stock carob solution is then sent by a positive pump into the infant milk in an amount of twenty (20) kilograms containing 0.60 kilogram of carob; the mixture is stirred at 1000 revolutions/minute for 300 seconds on the recirculation. It is also possible to directly incorporate the carob flour into the infant milk. The solution obtained has a viscosity of 0.1 Pascal.second. It is preheated to 72° C. and then homogenized at $1.7 \times 10^7$ pascals.

The UHT treatment is then carried out for two seconds at 140° C.

After cooling to 20° C., it is packaged under a sterile atmosphere.

A sterile longlife liquid milk is obtained which, at 20° C. has a viscosity close to 1.5 Pascals.second (against a viscosity of 0.1 Pascal.second for the original milk), which has all the properties inherent to the UHT process.

In addition, clinical trials show that this milk has excellent anti-regurgitation properties and is therefore perfectly suitable for the feeding of infants.

EXAMPLE 2

Example 1 is repeated adding to the carob-containing milk solution, just before the preheating which precedes the homogenization, an aqueous solution containing 0.1 gram/liter of a mixture of vitamins, which is commonly used in the dairy industry, especially for feeding infants, namely vitamins C, B6, B1 and the like.

The infant milks prepared in conformity with the invention have numerous advantages compared with the infant milks currently used. There may be mentioned:

- the fact that it is provided in liquid form ready to be heated, easy to drink for children, and having a very good smooth texture;
- a long shelf life with good homogeneity properties over time and good stability properties since after nine months of storage under the usual conditions, no significant degradation was observed;
- ease of use for the user since there is no longer any closing error, no more curds, and it is ready to use;
- a very good anti-regurgitation property and therefore presenting very good safety and convenience for the user and a saving of time.

We claim:

1. Process for the manufacture of a long life anti-regurgitation milk suitable for ingestion by infants comprising the steps of:
   preheating a milk;
   homogenizing said preheated milk;
   treating the homogenized milk at ultra high temperatures;
   packaging the treated milk under aseptic conditions in sterile containers; and
   introducing into the milk prior to the homogenization step between 0.3% and 1.0% by weight of the packaged milk a thickening agent that is chosen from the group consisting of carob, guar, and pectins and mixtures thereof.

2. The process of claim 1 wherein the thickening agent is carob.

3. The process of claim 2 that includes the further steps of preparing an aqueous solution containing to 35 grams/liter of carob and introducing the solution 10 at room temperature while stirring the solution at more than 100 revolutions/minute.

4. The process of claim 3 wherein the aqueous carob solution is stirred continuously prior to introducing the solution into the preheated infant milk.

5. The process of claim 2 wherein carob is introduced into the infant milk in powdered form in amounts of about 5 to 8 grams/liter of infant milk.

6. The process of claim 2 wherein the carob is introduced prior to the preheating step.

7. The process of claim 2 including the further step of dissolving the carob at room temperature in deionized water while stirring the deionized water.

8. The process of claim 1 wherein between 0.5% and 0.8% carob is introduced into the preheat ed infant milk.

* * * * *